(12) United States Patent
Stockert

(10) Patent No.: US 7,652,975 B2
(45) Date of Patent: Jan. 26, 2010

(54) INTEROPERABILITY VERIFICATION FOR IMPLEMENTATION ACCORDING TO COMMUNICATION STANDARD

(75) Inventor: Todd D Stockert, Valley Village, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 639 days.

(21) Appl. No.: 11/347,631

(22) Filed: Feb. 3, 2006

(65) Prior Publication Data

US 2007/0183302 A1    Aug. 9, 2007

(51) Int. Cl.
H04J 11/00    (2006.01)
H04J 1/16    (2006.01)
H04K 1/10    (2006.01)
(52) U.S. Cl. .................. 370/203; 370/491; 375/260
(58) Field of Classification Search ............. 370/203, 370/461, 491; 375/260
See application file for complete search history.

(56) References Cited

U.S. PATENT DOCUMENTS

| | | | | |
|---|---|---|---|---|
| 5,258,936 A | * | 11/1993 | Gallup et al. | 708/254 |
| 7,050,466 B1 | * | 5/2006 | Sung et al. | 370/515 |
| 7,307,969 B2 | * | 12/2007 | Shin | 370/331 |
| 7,453,793 B1 | * | 11/2008 | Jones et al. | 370/203 |
| 2004/0174822 A1 | * | 9/2004 | Bui | 370/252 |
| 2005/0157637 A1 | * | 7/2005 | Feng et al. | 370/203 |
| 2005/0237978 A1 | * | 10/2005 | Segal | 370/331 |
| 2006/0133388 A1 | * | 6/2006 | Wang et al. | 370/400 |
| 2007/0050542 A1 | * | 3/2007 | Benhase et al. | 711/114 |

OTHER PUBLICATIONS http://www.agilent.com/find/89600; Series Vector Signal Analyzers, downloaded Aug. 1, 2006, 5 pp.

* cited by examiner

*Primary Examiner*—Alpus H Hsu
*Assistant Examiner*—Saad Hassan

(57) ABSTRACT

A method for verifying interoperability of an implementation of a communication standard includes monitoring a symbol comprising a set of subcarrier symbols in a communication stream, in which some of the subcarrier symbols of the symbol are generated from pilot symbols, transmitted on subcarriers in accordance with the standard. For a given implementation and a given symbol, it is known which subcarriers will be pilot symbols, and what their pilot symbol values will be. A communication stream, generated by an implementation that is interoperable with the standard, will contain expected pilot information. Using the implementation to be verified, a communication stream is generated, containing pilot information. The generated pilot information is compared with the expected pilot information, and interoperability is determined based on the result of the comparing.

13 Claims, 2 Drawing Sheets

INTEROPERABILITY VERIFICATION FOR IMPLEMENTATION ACCORDING TO COMMUNICATION STANDARD

BACKGROUND OF THE INVENTION

The invention relates to communications, and has applicability to Metropolitan Area Networks according to the IEEE 802.16 WirelessMAN standard.

In a typical communication system architecture, users are coupled for communication to one or more nodes, such as base stations, which, in turn, are coupled for communication to public communication networks such as the Internet. Communication streams between such users pass through their respective base stations, and across the public networks.

Such communication streams are multiplexed within distinct frequency bands through techniques such as Orthogonal Frequency Division Multiplexing (OFDM) and Orthogonal Frequency Division Multiple Access (OFDMA). For instance, implementations of OFDMA include a physical (PHY) layer, and employ subcarriers having complex symbols (that is, symbols that include both real and imaginary components, and therefore can be characterized as having a phase). The complex symbols are modulated using a Pseudo-Random Bit Sequence (PRBS), which is generated from a seed value using PRBS generator register circuitry.

A user will employ an implementation of PRBS generator register circuitry, and of seed values. The user may develop the implementation him/herself, or may obtain it from a vendor. For instance, as the 802.16 standard becomes more accepted and commonplace, different implementations will become available from different vendors. Most such implementations will be in the form of 802.16e-OFDMA PHY chip designs. Such designs typically are highly integrated; that is, the PRBS function is integrated with the rest of the modulator, so it is probably done independently by each chip manufacturer.

In order for communication to take place between different users, their respective implementations of the seed value and the PRBS generator register circuitry should be interoperable. Failure to communicate can be due to lack of such interoperability. Therefore, it is desirable that, for a given implementation of an OFDMA transmitter, interoperability with other implementations can be verified.

Conventionally, interoperability verification of PRBS generator implementations (in particular, implementations of the PRBS generator register circuitry and the seed values) has been done ad-hoc and manually. The ad-hoc check has been done when interoperability problems or questions arise. A comparison is done between two implementations (usually the symbol bit output generated from a given PRBS seed) and then differences between them are identified (either in the filling of the PRBS register, or in the sequence output). This manual approach required working across implementations for comparison without independent verification. It also has required cooperation between different service provider companies, or between different hardware vendors.

Such conventional verification has been disadvantageous, among other reasons because the necessary cooperation between different companies may not always be available, and because the lack of independent verification makes it difficult to ensure interoperability proactively. Rather, interoperability problems can only be solved reactively, in response to observed communication problems.

SUMMARY OF THE INVENTION

Verifying interoperability of an implementation of a communication standard is done by monitoring a symbol comprising a set of subcarrier symbols (e.g., an OFDM symbol) in a communication stream produced by the implementation. Some of the subcarrier symbols of the symbol are generated from pilot symbols, transmitted on subcarriers in accordance with the standard. For a given implementation and a given symbol, it is known which subcarriers will be pilot symbols, and what their pilot symbol values will be. Verification involves verifying that the pilot symbols will be produced from an interoperable implementation of circuitry and seed value. Verifying interoperability between two implementations may then be done proactively, by verifying each one against the standard.

Further features and advantages of the present invention, as well as the structure and operation of preferred embodiments of the present invention, are described in detail below with reference to the accompanying exemplary drawings.

DETAILED DESCRIPTION

In the description of the invention which follows, references will be made to OFDM and OFDMA, in connection with exemplary embodiments. It will be understood that the invention has applicability in both the OFDM and OFDMA environments. Therefore, references to either OFDM or OFDMA are not intended to limit the applicability of the invention to these and other environments.

Verification of interoperability is done by defining a set of possible seed values, using the possible seed values to generate subcarrier bit streams and symbols having known pilot bit values, ruling out seed values based on their generated symbols if the pilot bits in the symbols don't match up with those pilot bits produced by the standard, and judging interoperability of the implementation with the standard, based on which, if any, of the possible seed values produce symbols compatible with the standard.

Figure 1:
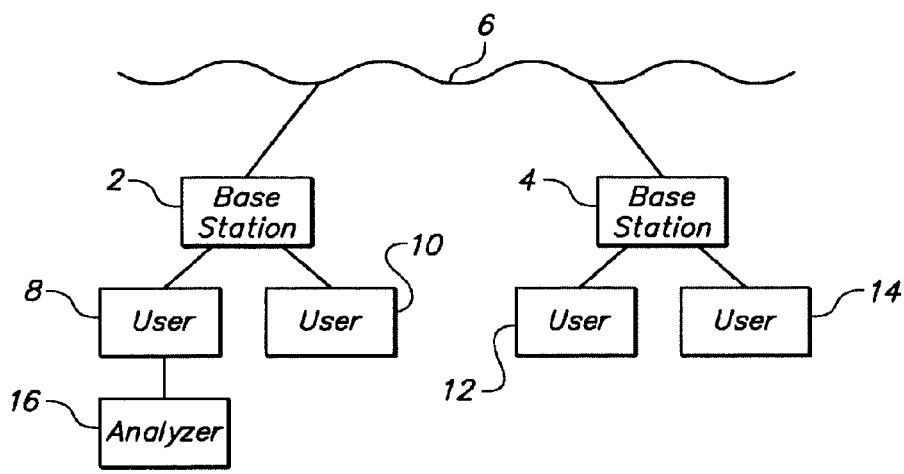
FIG. 1 is a block diagram showing an example of a communication architecture, within which embodiments of the invention are practiced.

The environment, in which the invention is practiced, is illustrated by the block diagram of FIG. 1. Base stations 2 and 4 are coupled to a communication network 6, for communication thereover. Users 8, 10, 12, and 14 are coupled to the base stations 2 and 4, as shown. If an implementation, resident on the user 8, is to be verified for interoperability in a manner to be described below, an analyzer 16 is coupled to the user 8 to receive, monitor and analyze a transmission signal generated by the implementation and transmitted from the user 8 to the base station 2.

It will be understood that there are other environments that are foreseeable alternatives to this initial description, such as 1) Use of a base station emulator or simulator instead of an actual network; 2) Use of test signals from the user terminals, to eliminate any connection to the network or emulator; and 3) User terminal simulation connected to test equipment (no actual hardware involved, interoperability testing performed entirely within the simulation). The invention set forth herein also applies to such other environments.

In this configuration, the implementation to be verified for interoperability is then tested, in a manner to be described. Interoperability between an implementation on the user 8 and, for instance, an implementation on the user 12 is verified by first verifying the user 8's implementation against the standard, and also verifying the user 12's implementation against the standard, using the analyzer 16, or another analyzer, similarly coupled to the user 12. If both users' implementations are interoperable with the standard, then they will be interoperable with each other.

It would be possible, in theory, to verify interoperability by verifying, by means of directly comparing the hardware and software implementations, to verify that they are the same. In practice, however, this is not possible because the party wishing to do the verification does not have direct access to either the bit sequence generator circuitry, or to the seed values loaded into the shift register 18. Rather, the analyzer 16 only has access to the bit stream coming from the output 22 of the implementation being tested. Therefore, verification of interoperability is performed by, in essence, comparing a bit stream generated in accordance with the standard, to the bit stream received from the output 22.

Figure 2:
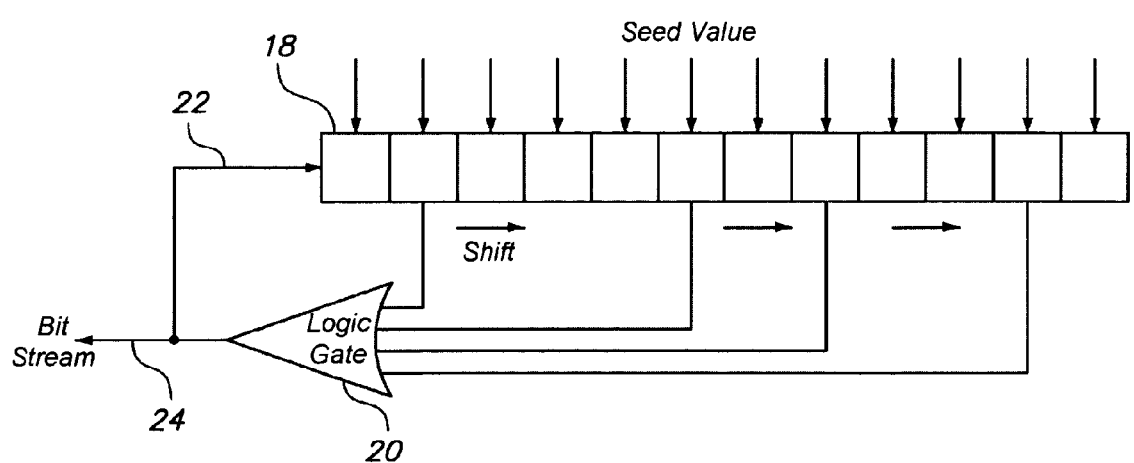
FIG. 2 is a schematic diagram of circuitry for a data sequence generator.

A more detailed description of the interoperability verification process will now be described. An OFDMA symbol is characterized in terms of a period of time during which signals on the subcarriers are modulated, for instance by a data sequence generator. Consider, for instance, the data sequence generator of FIG. 2. A shift register 18 is loaded with an initial value, such as a PRBS seed value. The shift register 18 is then clocked repeatedly. For instance, in the circuitry of FIG. 2, bits within stages of the shift register 18 are shifted from left to right. The bit values within predetermined stages of the shift register 18 are tapped, and logically combined by means of combinational logic, here shown as a logic gate 20. The output of the combinational logic is coupled to an input 22 of the shift register 18. Thus, once the seed value is loaded into the shift register 18, and clocking begins, a data sequence, in this case a bit stream, is produced at an output 24. That bit stream is used to modulate the signals on the various OFDM subcarriers.

When a given period of time, characteristic of a given OFDMA symbol, has elapsed, there will be a certain bit value in the shift register 18. For a given implementation of the seed value and the PRBS generator register circuitry, the bit sequence generated after a given elapsed period of time will be a given, repeatable value. Also, different implementations compatible with the standard will, after the given elapsed time, generate the same given, repeatable value.

The signals on the subcarriers to be modulated comprise data, idle signals, and/or pilot signals (discussed below). Accordingly, a communication signal, modulated in accordance with the bit sequence value, will be repeatable as well, except to the extent that the data portion of the signal to be modulated varies.

Pilot symbols and data symbols are mapped onto subcarriers to form an OFDM symbol. The standard specifies when and where pilot symbols will occur, and what their values are. The implementation is verified to be compatible with a standard, as to the given OFDM symbol, if the pilot symbol bit values match that provided, in the standard, for the OFDM symbol. Thus, overall interoperability of the implementation with a standard can be verified by verifying the pilot symbols of the OFDM symbols.

For example, Orthogonal Frequency Division Multiplexing (OFDM) is characterized in terms of a set of subcarriers over a given frequency band. See, for instance IEEE 802.11a-1999, available from the IEEE standards library. Section 17.3 describes the 802.11a OFDM PHY layer including how to generate an OFDM signal with pilot and data symbols. It will be understood, however, that the invention is not limited to OFDM, or to 802.11a. Alternatively, the invention also applies to more complicated structures, and to varying, rather than constant, PRBS such as 802.16e OFDMA. However, for illustrative purposes the 802.11a standard is here described, so as to show the transmission of OFDM.

An OFDM symbol comprises one data symbol (made of M bits, where M is a predetermined integer value) for each subcarrier. Thus, an OFDM symbol can be expressed in terms of a binary word, in which there is are M bits for each subcarrier, and each bit has a respective value, based on the data value in the subcarrier. For instance, OFDM using BPSK modulation and having 841 subcarriers will have data symbols of M=1 bits per symbol, so a Binary Phase Shift Keying (BPSK) OFDM symbol will contain 841 bits. QPSK modulation has data symbols of M=2 bits per symbol, so, in this case a QPSK OFDM symbol will contain 1682 bits.

It will sometimes be the case that a given subcarrier will be carrying pilot information, such as a pilot symbol, which is a signal used for synchronization or reference purposes. Which subcarriers are carrying pilot symbols at a given point in time, and the value (in the case of BPSK pilot symbols, 0 or 1) of a given pilot symbol at a given time, are known from the standard.

Therefore, a given OFDM symbol will be made up of a mixture of data bits of unknown value, and known pilot symbol bits from the standard. Pilot symbols and data symbols are mapped onto subcarriers to form an OFDM symbol. The OFDM symbols thus contain pilot symbols, instead of data symbols, on some subcarriers.

Pilot symbols, on given subcarriers at given times, are characteristic of a given OFDM implementation. In many OFDM implementations, a BPSK modulation type is applied to the pilot symbols. The pilot or data symbols may be characterized in terms of a phase on the complex l+jQ plane. BPSK, as an example, could be viewed as a pilot symbol of value 0 having phase 0 degrees, and a pilot symbol of value 1 having phase 180 degrees. That is, a 0 would indicate the signal on a given subcarrier remains at its current phase, whereas a 1 would indicate the signal on a given subcarrier would be rotated 180 degrees. This is how the BPSK pilot symbols are "demodulated" or "de-mapped" into pilot bits. BPSK is a modulation technique where the carrier is shifted by 180 degrees in accordance with a digital bit stream and with the specific data mapping employed. As an example, "0" would not produce a phase transition where as "1" would cause a phase transition to occur.

In one embodiment of the method of the invention, the PRBS seed value is detected based upon the phase of the BPSK Pilots in the OFDM signal. By converting the pilot phases into bits, a mixture of unknown data bits and known pilot phase bits is produced. The bit sequence will be sparse (that is, mostly unknown data bits and few known pilot bits), with one known bit for each pilot subcarrier. The method of the invention employs the pilot bits, and/or their phase values.

Therefore, in an embodiment of the invention, it is possible to use a PRBS sequence elimination procedure, to determine which possible seed values, used for modulating subcarriers carrying known pilot symbols at known times, could result in the observed OFDM symbol. Interoperability of the implementation can then be verified, by verifying that the seed value thusly determined matches that of the standard.

In accordance with one embodiment of the invention, a process is used to test the possible seed values. An example of the process, as per one embodiment of the invention, is set forth in FIG. 3.

Figure 3:
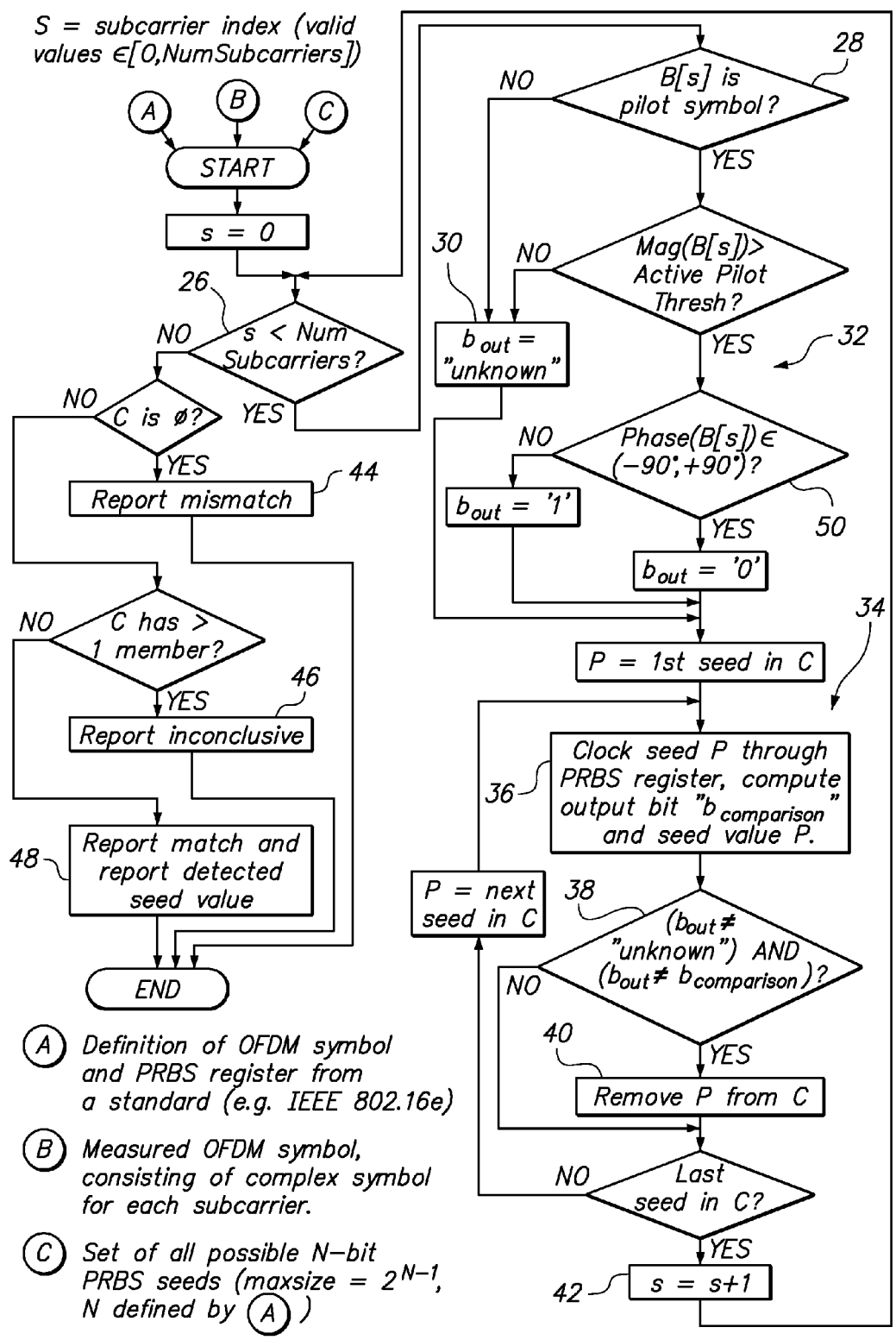
FIG. 3 is a flowchart showing a process, according to an embodiment of the invention, for verifying interoperability of an implementation with a standard.

While FIG. 3 is expressed partially in terms of "pseudo-code," the essential functionality of the method will be understood to persons skilled in the art. Variations in implementations, sequences of steps, etc., are understood to be within additional embodiments of the invention. Note, also, that while an OFDM symbol is described, other types of communications, for instance those referred to elsewhere in the present patent application, and others that would be known to those skilled in the art, may be used.

The process of FIG. 3 involves deleting seeds from the set of possible seeds, if the seeds cannot generate a symbol having the pilot symbols on subcarriers, as per the standard. That is, given a detected symbol, for each subcarrier, detecting whether the subcarrier includes a pilot symbol and if so whether that pilot symbol would result from an interoperable implementation. For each subcarrier, the seeds in the set are tested. Seeds are eliminated from the set, if they result in a symbol having a pilot symbol, on any of the subcarriers, that does not match the pilot symbol expected from the standard.

Initially, there is a received, or measured, symbol made up of subcarrier symbols for each of the subcarriers. In FIG. 3, the received symbol is described as an OFDM symbol.

Initially, there is also a set of possible seed values suitable for the particular embodiment. For instance, a set of all N-bit seed values, where N is the length of the PRBS register, as defined in the standard, can be generated by taking the binary values 0 through $2^N-1$, which are all of the $2^N$ possible binary bit values for a word of such length. Depending on the particular implementation, there may be reasons for omitting some of these $2^N$ possible binary bit values from the initial set of possible seed values.

The process includes performing iterations (to be described) for each of the subcarriers. In one embodiment, all subcarriers within the set are tested (block 26 of FIG. 3).

For the subcarrier being tested, it is ascertained whether the subcarrier symbol is a pilot symbol. If it is not a pilot symbol, then we move to the next subcarrier (blocks 28 and 30).

If the subcarrier symbol is a pilot symbol, then the value of the pilot symbol is determined (block 32). In one embodiment, this determination can include a consideration of the phase of the symbol, as described above.

For the pilot symbol, a test (generally shown as block 34) is performed on each seed within the set of possible seeds. The test includes starting from the seed, generating a communication stream (block 36), and determining whether (block 38) the resultant communication stream can include the identified pilot symbol for this subcarrier. As this part of the process tests the various possible seeds, it often will be found that many of the possible seeds cannot produce the identified pilot symbol. Each such seed is removed (block 40) from the set of possible seeds, since there will be no need to test the seed further, against other pilot symbols on other subcarriers. Thus, as seeds are successively tested to see if they can generate the identified pilot symbol, the set of possible seeds will dwindle in size, often rapidly.

When the seeds have been tested against one pilot symbol on one subcarrier, we look to the next subcarrier, and the next, etc., (block 42), to find additional pilot symbols and test the remaining seeds in the dwindling set in the manner just described.

After all subcarriers have been tested (block 26), conclusions are drawn based on the number of possible seeds remaining. The result of the above process is that a set of seed values that produce correct pilot bits is identified. Seed values within the set are capable of generating the identified pilot symbols in the OFDM symbol. There can be either zero such seed values, exactly one, or more than one.

If no seeds remain (step 44), then it indicates the PRBS generator used by the signal does not conform to 802.16 OFDMA, report this to user. In one embodiment of the invention, steps 28-36 may be repeated, with 0 and 1 swapped in the sequence generated in step 28. This would accommodate cases where BPSK pilots could be inverted in phase.

If more than one seed remains (step 46), then this result indicates inconclusive PRBS seed detection, likely due to too few pilots to identify a unique seed. That is, not enough pilots were present in the symbol to conclusively determine whether the PRBS seed is an interoperable implementation. This result is reported to the user.

If exactly one PRBS seed remains (step 48), then the result is that the one PRBS seed is deemed to correspond to the transmitted PRBS seed value. This result is reported to the user.

Additionally, the remaining seed is compared against the PRBS seed value that would result from parameters the user has specified in the measurement configuration. This comparison is reported to the user.

The detected PRBS seed is compared to the PRBS seed value computed from user parameters. In one embodiment, both are compared. If the seed value is correct, and the register implementation is correct, then the generated bits will be correct.

Presenting the PRBS seed value which was detected (if the PRBS bit sequence was conforming to the standard), will tell the user if they have loaded the register correctly based upon the parameters which define the PRBS seed at that instant. For instance, one possible problem that would be detected would be that the register, or a portion of it, was incorrectly loaded least significant bit (LSB) to most significant bit (MSB), or vice-versa, not matching the standard. This problem is sometimes called wrong "endian-ness." Thus, problems may be detected, such as incorrectly interpreting the endian ordering of bits loaded into the PRBS register.

Also, a "no match" indicator will tell the user that the PRBS sequence generation logic is incorrect, for instance, when the connections are to the wrong bits in the register.

This means the user does not need to understand the PRBS definition to determine if the PRBS sequence is correct, they just set up the base user parameters, and the PRBS seed comparison is performed automatically.

The PRBS sequence detection algorithm provided above may be performed twice with inverted bit sequences, to determine if a bit phase inversion has occurred. That is, the bit values might be '1' when phase from (−90, +90], and '0' otherwise. This embodiment may be illustrated with a flow-chart similar to FIG. 3, but with the phase test (block 50) suitably inverted from what is shown in the flow chart of FIG. 3. Also, an embodiment of the invention could be implemented using the operator "Real(B[s])>0" in place of the phase description of BPSK demodulation set forth above.

Systems that include preferred embodiments of the invention may also provide other signal quality metrics to the user:

For further information on such additional functionality, please consult product literature for such systems and equipment, such as the 89601A Vector Signal Analyzer, made and sold by Agilent Technologies, Inc.

Thus, it is possible proactively to determine whether two implementations are interoperable, by performing the above test for each of the implementations. They will be interoperable with each other, if each one is found to be interoperable with the standard. Such interoperability tests on multiple implementations can be done simultaneously, or one at a time, using the same analyzer 16, coupled to one user at a time.

A method for verifying interoperability, as described above, can be implemented in an apparatus such as a piece of test equipment or other equipment, for instance the analyzer 16 of FIG. 1. The analyzer 16 is coupled to a user, as shown, to monitor a symbol from a communication stream, identify a symbol from the communication stream, the symbol comprising subcarrier symbols that may include pilot symbols, and perform the above-described interoperability test on that symbol.

Also, the method of the invention can be implemented in software, such as a software simulation, or using the other approaches set forth above (particularly those in the second paragraph of the Detailed Description). In particular, software embodiments of the invention may be provided as a computer program product, such as a CD-ROM or other computer-readable medium containing software, that a user can install onto computing or processing equipment such as programmable test equipment, that will enable the equipment to perform a method in accordance with embodiments of the invention described herein or otherwise understood from the description given herein. Such software may also be downloadable from a communication network such as the Internet.

Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A method for verifying interoperability of an implementation of a communication standard with the communication standard, the method comprising:
   (A) generating a communication stream containing pilot information, the communication stream being generated from a set of seed values using a data sequence generator;
   (B) receiving the communication stream via circuitry of a signal analyzer, the signal analyzer comparing the pilot information with pilot information expected from an implementation that is interoperable with the standard, the comparing including:
      (1) identifying pilot symbols from the generated communication stream,
      (2) comparing the identified pilot symbols with the expected pilot symbols, and
      (3) examining a phase of the pilot symbols from the generated communication stream; and
   (C) determining interoperability based on the result of the comparing.

2. A method as recited in claim 1, wherein the creating a set of seed values includes creating a set of words, each word being of a predetermined bit length and comprising a respective bit combination.

3. A method as recited in claim 2, wherein:
   each word has a bit length N, where N is an integer;
   the set of words includes $2^N$ words, and
   the words include all possible bit combinations.

4. A method as recited in claim 1, further comprising:
   using each seed value into the data sequence generator; and
   operating the data sequence generator to generate a respective communication stream from each seed value, each communication stream including a generated symbol.

5. A method as recited in claim 4, wherein the determining includes, for a given one of the seed values:
   identifying a pilot symbol in the generated symbol;
   comparing the identified pilot symbols with the expected pilot symbols;
   based on the comparing, determining whether there is a match between the expected pilot symbol and the identified pilot symbol; and
   removing the given seed value from the set of seed values if there is not a match between the identified pilot symbol and the expected pilot symbol.

6. A method as recited in claim 5, wherein the determining further includes:
   determining a number of seed values remaining in the set of seed values after comparing;
   if the number of remaining seed values is zero, determining that the implementation is not interoperable;
   if the number of remaining seed values is one, determining that the implementation is interoperable; and
   if the number of remaining seed values is greater than one, determining that it is uncertain whether the implementation is interoperable.

7. A computer-readable medium having a computer program product thereon, the computer program product, when executed by a computer, directing processing equipment to perform a method as recited in claim 1.

8. An apparatus for verifying interoperability of an implementation of a communication standard with the communication standard, the apparatus comprising:
   (A) means for generating a communication stream containing pilot information, the communication stream being generated from a set of seed values using a data sequence generator;
   (B) means for comparing the pilot information with pilot information expected from an implementation that is interoperable with the standard, the means for comparing including:
      (1) means for identifying the pilot symbols from the generated communication stream;
      (2) means for comparing the identified pilot symbols with the expected pilot symbols; and
      (3) means for examining a phase of the pilot symbols from the generated communication stream; and
   (C) means for determining interoperability based on the result of the comparing.

9. An apparatus as recited in claim 8, wherein the means for generating a communication stream uses a set of seed values including a set of words, each word being of a predetermined bit length and comprising a respective bit combination.

10. An apparatus as recited in claim 9, wherein:
    each word has a bit length N, where N is an integer;
    the set of words includes $2^N$ words, and
    the words include all possible bit combinations.

11. An apparatus as recited in claim 8, further comprising:
    means for using each seed value in the data sequence generator; and
    means for operating the data sequence generator to generate a respective communication stream from each seed value, each communication stream including a generated symbol.

12. An apparatus as recited in claim 11, wherein the means for determining includes, for a given one of the seed values:

means for identifying a pilot symbol in the generated symbol;

means for comparing the identified pilot symbols with the expected pilot symbols;

based on the comparing, means for determining whether there is a match between the expected pilot symbol and the identified pilot symbol; and means for removing the given seed value from the set of seed values if there is not a match between the identified pilot symbol and the expected pilot symbol.

13. An apparatus as recited in claim 12, wherein the means for determining further includes:

means for determining a number of seed values remaining in the set of seed values after comparing;

means, operable if the number of remaining seed values is zero, for determining that the implementation is not interoperable;

means, operable if the number of remaining seed values is one, for determining that the implementation is interoperable; and means, operable if the number of remaining seed values is greater than one, for determining that it is uncertain whether the implementation is interoperable.

\* \* \* \* \*

UNITED STATES PATENT AND TRADEMARK OFFICE
CERTIFICATE OF CORRECTION

PATENT NO. : 7,652,975 B2 Page 1 of 1
APPLICATION NO. : 11/347631
DATED : January 26, 2010
INVENTOR(S) : Todd D Stockert It is certified that error appears in the above-identified patent and that said Letters Patent is hereby corrected as shown below:

In column 7, line 52, in Claim 1, before "pilot" insert -- the --.

Signed and Sealed this

Thirtieth Day of March, 2010

David J. Kappos
*Director of the United States Patent and Trademark Office*